(12) United States Patent
Kunal (10) Patent No.: US 12,153,937 B2
(45) Date of Patent: Nov. 26, 2024

(54) METHOD AND SYSTEM FOR AUTOMATED DATA DRIVEN CONFIGURATION MANAGEMENT

(71) Applicant: JPMorgan Chase Bank, N.A., New York, NY (US)

(72) Inventor: Kishor Kunal, Begusarai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 38 days.

(21) Appl. No.: 18/103,832

(22) Filed: Jan. 31, 2023

(65) Prior Publication Data

US 2024/0202009 A1    Jun. 20, 2024

(30) Foreign Application Priority Data

Dec. 14, 2022   (IN) .............................. 202211072215

(51) Int. Cl.
*G06F 1/24*       (2006.01)
*G06F 9/445*      (2018.01)
*G06F 9/4401*     (2018.01)

(52) U.S. Cl.
CPC ........ *G06F 9/44505* (2013.01); *G06F 9/4411* (2013.01)

(58) Field of Classification Search
CPC .................................................. G06F 9/44505
USPC ....................................................... 713/100
See application file for complete search history.

(56) References Cited

U.S. PATENT DOCUMENTS

| | | | | |
|---|---|---|---|---|
| 10,817,757 | B2* | 10/2020 | Sainani | G06N 5/025 |
| 11,616,700 | B1* | 3/2023 | Berg | G06F 8/71 |
| | | | | 709/220 |
| 2019/0102921 | A1* | 4/2019 | Mittal | G06F 3/0481 |
| 2019/0114210 | A1* | 4/2019 | Han | G06F 9/5077 |
| 2020/0111344 | A1* | 4/2020 | Raj | G08B 27/00 |
| 2021/0049419 | A1* | 2/2021 | Bhaowal | G06F 18/2185 |
| 2021/0304073 | A1* | 9/2021 | Li | G06N 20/00 |
| 2022/0029887 | A1* | 1/2022 | Gupta | H04L 41/0893 |
| 2023/0186148 | A1* | 6/2023 | Nelson | G06N 3/09 |
| | | | | 706/12 |
| 2023/0259117 | A1* | 8/2023 | Manotas Gutierrez | |
| | | | | G05B 23/0283 |
| | | | | 700/28 |
| 2023/0267349 | A1* | 8/2023 | Abrol | G06N 3/08 |
| | | | | 706/12 |
| 2023/0289690 | A1* | 9/2023 | Plakkatt | G06Q 10/0633 |
| 2024/0020291 | A1* | 1/2024 | Nogles, Jr. | G06F 16/2365 |

FOREIGN PATENT DOCUMENTS

WO    WO-2022072908 A1 *  4/2022  .......... G06F 16/219

* cited by examiner

*Primary Examiner* — Volvick Derose
(74) *Attorney, Agent, or Firm* — GREENBLUM & BERNSTEIN, P.L.C.

(57) ABSTRACT

A method for automated data driven configuration management is provided. The method includes: receiving a set of data from a plurality of sources; automatically processing the received data into service data using at least one trained model; and routing the service data for configuration management.

15 Claims, 5 Drawing Sheets

METHOD AND SYSTEM FOR AUTOMATED DATA DRIVEN CONFIGURATION MANAGEMENT

CROSS-REFERENCE TO RELATED APPLICATIONS

This application claims priority benefit from Indian Application No. 202211072215, filed Dec. 14, 2022 in the India Patent Office, which is hereby incorporated by reference in its entirety.

FIELD OF THE DISCLOSURE

This technology generally relates to virtualized data control systems and in particular, to a method and a system for automated data driven configuration management.

BACKGROUND INFORMATION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

Organizations today generate and handle large volumes of data that need to be stored in storage devices. The data storage demand cannot be anticipated with accuracy as it keeps on changing and is dynamic in nature. Cloud storage and virtualization helps in this regard and the data storage capability is provided over the cloud. The software requirement of the organization and the required software are installed on the hypervisor to provide virtual machine for the users of the cloud storage. The software requirement of the organization is further operationalized and rationalized by Configuration Management System (CMS).

CMS performs the task of installing, configuration, maintenance and upgrading the software & configurations on the machines within the system. The configuration management process initiates with the collection of information relating to configuration data from each application and the network topology. The information so collected is stored as the baseline configuration. The baseline configuration is stored in the central repository as the known good configuration that can perform the intended operation, without bugs and errors.

One drawback of the conventional process is manual intervention required in making changes to the configuration management system based on the dynamic requirements of the organization, thereby making it a tedious and time-consuming task. The conventional process involving the support team to fetch the required data from one or more data sources takes a significant amount of time which could be better invested in dealing with the critical issues.

Hence, in view of these and other existing limitations, there arises an imperative need to provide an efficient solution to overcome the above-mentioned limitations and to provide a method and system for automated data driven configuration management.

SUMMARY

The present disclosure, through one or more of its various aspects, embodiments, and/or specific features or sub-components, provides, inter alia, various systems, servers, devices, methods, media, programs, and platforms for automated data driven configuration management.

According to an aspect of the present disclosure, a method for automated configuration management is disclosed. The method is implemented by at least one processor. The method includes the step of receiving, by the at least one processor via a communication interface, a set of data from a plurality of sources. Next, the method includes automatically processing, by the at least one processor, the received data into service data using at least one trained model. Thereafter, the method includes routing, by the at least one processor via the communication interface, the service data for the automated configuration management.

In accordance with an exemplary embodiment, the set of data may include raw data required for the automated configuration management.

In accordance with an exemplary embodiment, the plurality of sources may include at least one from among a local server and/or a cloud server configured to store the set of data.

In accordance with an exemplary embodiment, the at least one trained model may include a machine learning model.

In accordance with an exemplary embodiment, the service data may include output data required for the automated configuration management, wherein the output data may further include a record of at least one change performed on the set of data during the automatic processing of the received data.

According to another aspect of the present disclosure, a computing device configured to implement an execution of a method for automated configuration management is disclosed. The computing device includes a processor; a memory; and a communication interface coupled to each of the processor and the memory. The processor is configured to: receive, via the communication interface, a set of data from a plurality of sources; automatically process the received data into service data using at least one trained model; and route, via the communication interface, the service data for the automated configuration management.

In accordance with an exemplary embodiment, the set of data may include raw data required for the automated configuration management.

In accordance with an exemplary embodiment, the plurality of sources may include at least one from among a local server and/or a cloud server configured to store the set of data.

In accordance with an exemplary embodiment, the at least one trained model may include a machine learning model.

In accordance with an exemplary embodiment, the service data may include output data required for the automated configuration management, wherein the output data may further include a record of at least one change performed on the set of data during the automatic processing of the received data.

According to yet another aspect of the present disclosure, a non-transitory computer readable storage medium storing instructions for automated configuration management is disclosed. The instructions include executable code which, when executed by a processor, causes the processor to: receive a set of data from a plurality of sources; automatically process the received data into service data using at least one trained model; and route the service data for the automated configuration management.

In accordance with an exemplary embodiment, the set of data may include raw data required for the automated configuration management.

In accordance with an exemplary embodiment, the plurality of sources may include at least one from among a local server and/or a cloud server configured to store the set of data.

In accordance with an exemplary embodiment, the at least one trained model may include a machine learning model.

In accordance with an exemplary embodiment, the service data may include output data required for the automated configuration management, wherein the output data may further include a record of at least one change performed on the set of data during the automatic processing of the received data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units/controller described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

To overcome the problems associated with excessive consumption of time and resources in manually collecting and processing data for the configuration management, the present disclosure provides a method and system for automated data driven configuration management using trained models. The system first receives and reads data from a plurality of sources such as various data lakes. The data lakes are centralized repositories and store both structured and unstructured data. The data is stored in the raw and unmodified format and the data can be subjected to different types of analytics like big data processing, real-time analytics, and machine learning thereby facilitating decision making. The present method and system are capable of reading and receiving files of any application and format as stored in the data lakes. In an example, even if Application A relies on data file of type X and Application B relies on data file of type Y, the system is capable to read data files of both applications, i.e., type X of application A and type Y of application B. Thus, the present system or device is customizable as per the type of application. Further, the system is hardware agnostic and ensures that the same result is created irrespective of where the results are created. Further, the system receives the data from a plurality of sources, which includes and are not limited to, the data lakes or databases that may be local servers or cloud servers in a virtualised data control set-up.

Next, the system is configured to process the received data into service data required by the configuration management system. The raw data received from the plurality of sources (such as various data lakes) are then processed by trained models to generate data that can be directly utilized for the configuration management, thereby reducing the need for manual intervention. In a non-limiting embodiment, the trained model corresponds to a machine learning model that is designed to process the raw data and generate service data. The service data generated out of the raw data can be used for configuration management and related decisions with minimal or no manual intervention. For example, the system requires a new set of software based on the new set of data that is being handled and stored in the data lakes. The raw data stored in the data lakes will be processed by the trained model and service data will be generated that can be used directly by the configuration management system to make decisions on the system requirement of additional software set-up. Thereafter, the system routes the service data to the configuration management system for making decisions on the additional requirements or upgrades needed to ensure robust and bug-free performance. In a non-limiting embodiment of the present disclosure, the system processes the set of data from a plurality of sources using a supervised machine learning model.

The present disclosure in a non-limiting embodiment, relies upon authentication and authorization mechanism to ensure security of the organizational data over the network and prevent any unauthorized access to the Configuration Management System.

In an example, the system rationalizes and creates systematic and ready to use data for the configuration management system for making quick and efficient decisions for the system requirements with minimal manual intervention. Therefore, the present disclosure increases efficiency of the system and organization by providing for the dynamic hardware and software requirements, making the system efficient and responsive to the changing needs based on the nature of data. Further, the implementation of the features of the present disclosure results in achieving better efficiency owing to various factors as has been explained hereinbelow. The factors include but are not limited to automated data driven configuration management, creating robust and responsive configuration management system, increasing efficiency of the configuration management process and the like.

Figure 1:
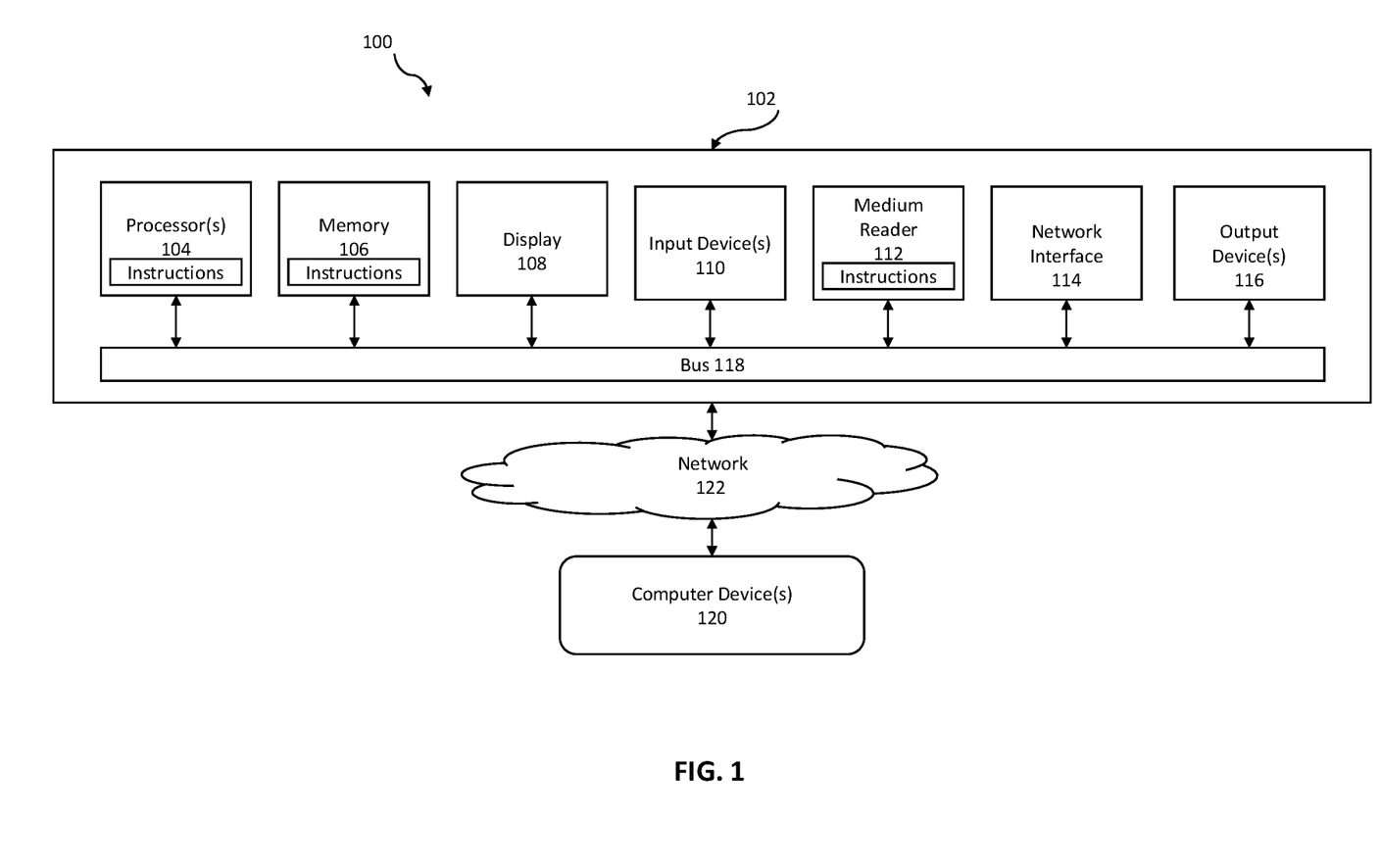
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As used herein, a data lake is a centralized repository that stores both structured and unstructured data at any scale. The data stored in a data lake may or may not be curated and is stored generally in the raw format and needs processing prior to being used in decision making by the configuration management system.

As used herein, service data is the data obtained after the required processing by the machine learning trained models. The data additionally includes the metadata related to the processing of the raw data such as the reasons for a change, record of changes made, etc., to facilitate decision making by the configuration management system.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software Instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. As regards the present invention, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automated data driven configuration management.

Figure 2:
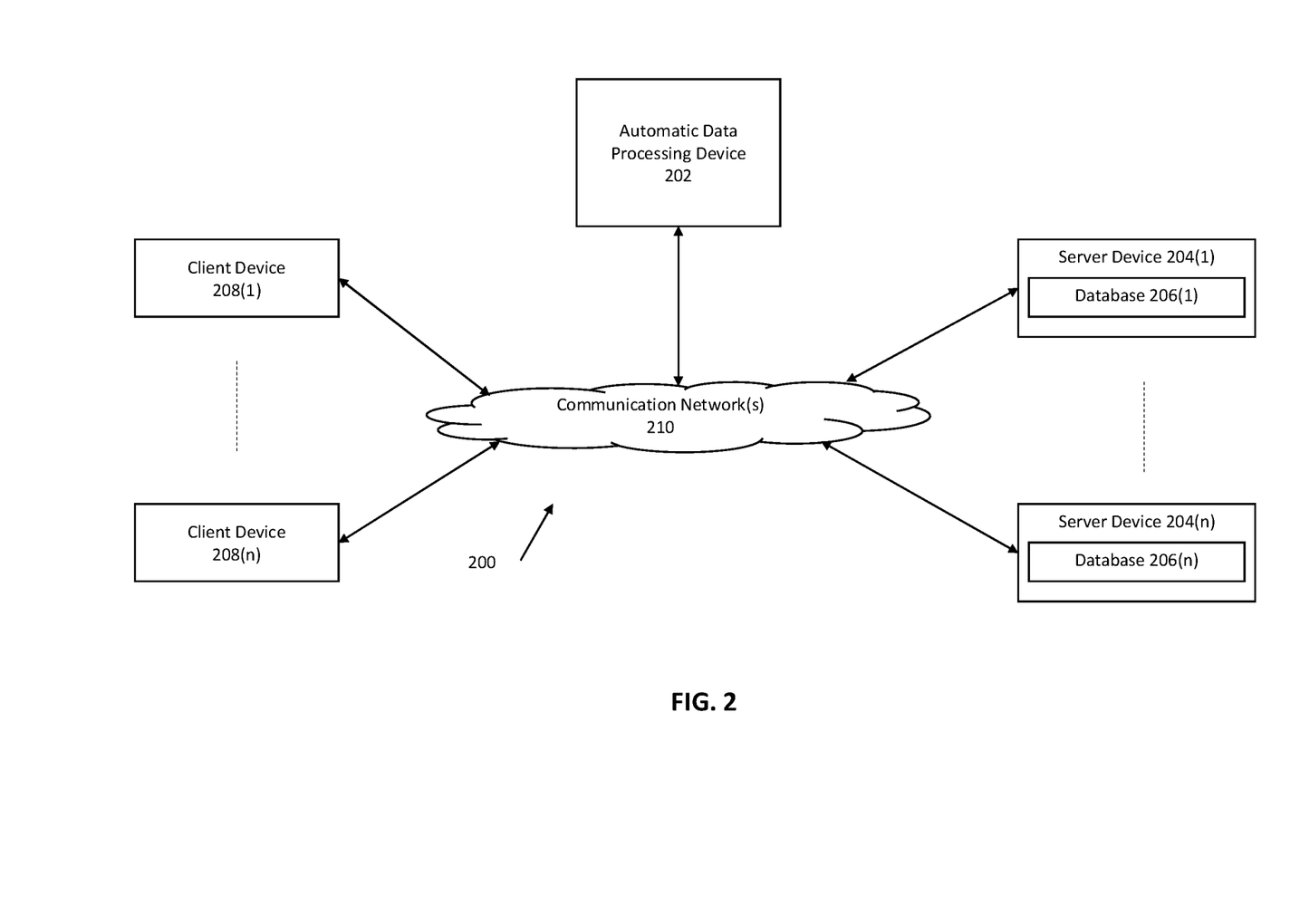
FIG. 2 illustrates an exemplary diagram of a network environment.

Referring to FIG. 2, a schematic of an exemplary network environment 200 for implementing a method for automated data driven configuration management using trained model is illustrated. In an exemplary embodiment, the method is executable on any networked computer platform, such as, for example, a personal computer (PC).

The method for automated data driven configuration management may be implemented by an Automatic Data Processing (ADP) Device 202. The ADP Device 202 may be the same or similar to the computer system 102 as described with respect to FIG. 1. The ADP Device 202 may store one or more applications that can include executable instructions that, when executed by the ADP Device 202, cause the ADP Device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as virtual machine(s) or virtual server(s) that may be managed in a cloud-based computing environment. Also, the application(s), and even the ADP Device 202 itself, may be located in virtual server(s) running in a cloud-based computing environment rather than being tied to one or more specific physical network computing devices. Also, the application(s) may be running in one or more virtual machines (VMs) executing on the ADP Device 202. Additionally, in one or more embodiments of this technology, virtual machine(s) running on the ADP Device 202 may be managed or supervised by a hypervisor.

In the network environment 200 of FIG. 2, the ADP Device 202 is coupled to a plurality of server devices 204(1)-204(n) that hosts a plurality of databases 206(1)-206(n), and also to a plurality of client devices 208(1)-208(n) via communication network(s) 210. A communication interface of the ADP Device 202, such as the network interface 114 of the computer system 102 of FIG. 1, operatively couples and communicates between the ADP Device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ADP Device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ADP Devices that efficiently implement a method for automated data driven configuration management.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, tele traffic in any suitable form (e.g., voice, modem, and the like), Public Switched Telephone Network (PSTNs), Ethernet-based Packet Data Networks (PDNs), combinations thereof, and the like.

The ADP Device 202 may be implemented by a stand-alone device or integrated with one or more other devices or apparatuses, such as one or more of the server devices 204(1)-204(n), for example. In one particular example, the ADP Device 202 may include or be hosted by one of the server devices 204(1)-204(n), and other arrangements are also possible. Moreover, one or more of the devices of the ADP Device 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the ADP Device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to configuration data from each application and network topology.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ADP Device 202 via communication network(s) 210. Accordingly, the client devices 208(1)-208(n) may be mobile computing devices, desktop computing devices, laptop computing devices, tablet computing devices, or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ADP Device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ADP Device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADP Device 202, the server devices 204(1)-204(n), or the client devices 208(1)-208(n), for example, may be configured to operate as virtual instances on the same physical machine. In other words, one or more of the ADP Device 202, the server devices 204(1)-204(n), or the client devices 208(1)-208(n) may operate on the same physical device rather than as separate devices communicating through communication network(s) 210. Additionally, there may be more or fewer ADP Device 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only tele traffic in any suitable form (e.g., voice and modem), wireless traffic networks, cellular traffic networks, Packet Data Networks (PDNs), the Internet, intranets, and combinations thereof.

Figure 3:
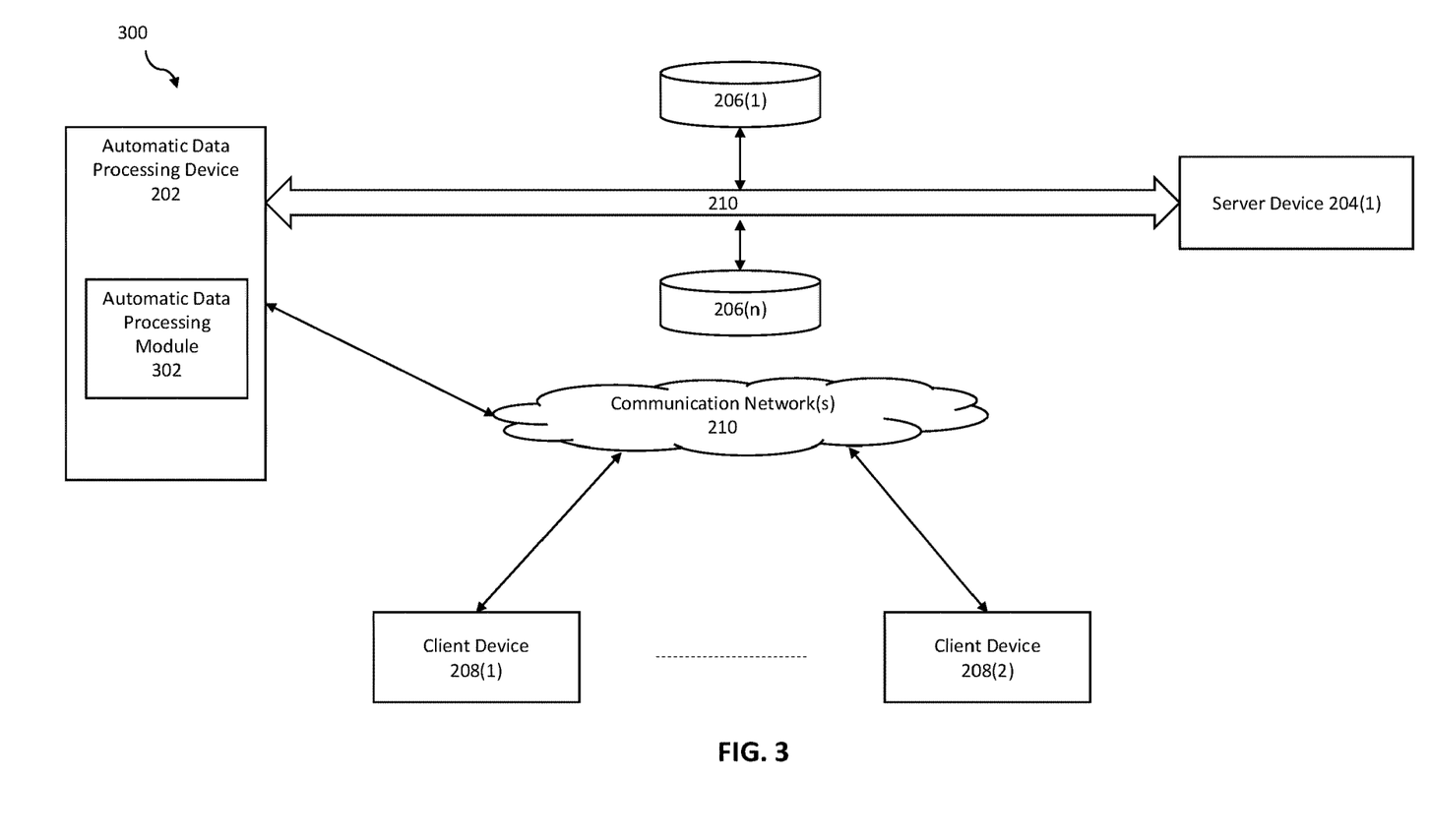
FIG. 3 shows an exemplary system for implementing a method for automated data driven configuration management, in accordance with an exemplary embodiment of the present disclosure.

FIG. 3 illustrates an exemplary system for implementing a method for automated data driven configuration management using trained models, in accordance with an exemplary embodiment. As illustrated in FIG. 3, according to exemplary embodiments, the system 300 may comprise ADP Device 202 including an Automatic Data Processing (ADP) Module 302 that may be connected to a server device 204(1) and one or more repository 206(1) . . . 206(n) via a communication network 210, but the disclosure is not limited thereto.

The ADP Device 202 is described and shown in FIG. 3 as including an ADP module 302, although it may include other rules, policies, modules, databases, or applications, for example. As will be described below, the ADP module 302 is configured to implement automatic processing of raw data from a plurality of sources into service data using trained models.

An exemplary process 300 for implementing a mechanism for automated data driven configuration management using trained model by utilizing the network environment of FIG. 2 is shown as being executed in FIG. 3. Specifically, a first client device 208(1) and a second client device 208(2) are illustrated as being in communication with ADP Device 202. In this regard, the first client device 208(1) and the second client device 208(2) may be "clients" of the ADP Device 202 and are described herein as such. Nevertheless, it is to be known and understood that the first client device 208(1) and/or the second client device 208(2) need not necessarily be "clients" of the ADP Device 202, or any entity described in association therewith herein. Any additional or alternative relationship may exist between either or both of the first client device 208(1) and the second client device 208(2) and the ADP Device 202, or no relationship may exist.

Further, ADP Device 202 is illustrated as being able to access the one or more repositories 206(1) . . . 206(n). The ADP module 302 may be configured to access these repositories/databases for implementing a method for automated data driven configuration management.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ADP Device 202 via broadband or cellular communication. Of course, these embodiments are merely exemplary and are not limiting or exhaustive.

Figure 4:
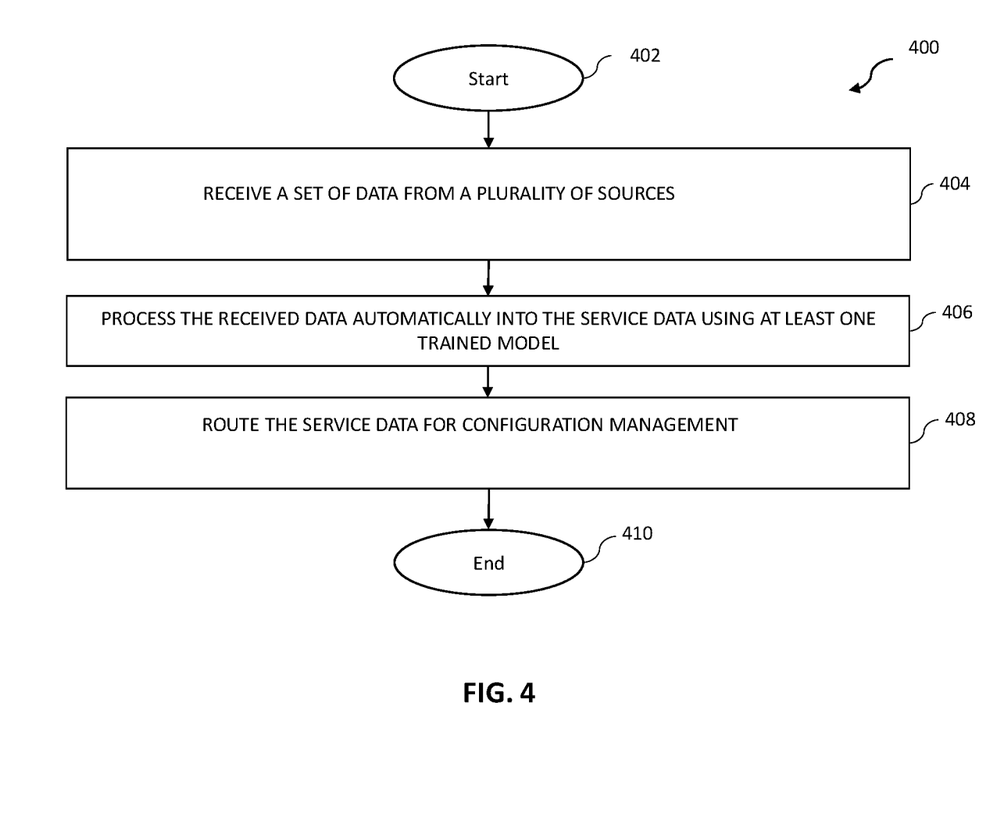
FIG. 4 illustrates an exemplary method flow diagram for automated data driven configuration management, in accordance with an exemplary embodiment of the present disclosure.

Referring to FIG. 4, an exemplary method is shown for automated data driven configuration management, in accordance with exemplary embodiment of the present disclosure. As shown in FIG. 4, the method begins at step following a change in a requirement of a system and its users, due to a change in the configuration data of applications and network topology.

At step [404], the method comprises receiving, by at least one processor via a communication interface, a set of data from a plurality of sources. In the present disclosure, the set of data corresponds to raw data required for the automated configuration management available on premises, on data syntax, and/or on server. In a non-limiting embodiment, the plurality of sources includes at least one from among a local server and/or a cloud server configured to store the set of data. The set of received data includes but is not limited to physical and virtual networks, security posture, performance, configuration, security controls, audit and/or review of the system. The set of data is received and read by at least one processor. In another embodiment, the processor extracts the data based on at least one requirement directly from cached storage connected with the plurality of the data sources.

At step [406], the method comprises automatically processing, by at least one processor, the received data into service data using at least one trained model. In a non-limiting embodiment, the trained model includes a supervised machine learning model. In another non-limiting embodiment, the trained model includes an unsupervised machine learning model. In an exemplary embodiment, machine learning may include supervised learning algorithms such as, for example, k-medoids analysis, regression analysis, decision tree analysis, random forest analysis, k-nearest neighbors' analysis, logistic regression analysis, K-fold cross-validation analysis, balanced class weight analysis, etc. The model is trained by using similar data of different types and formats and mapping it to the types and formats of data required for configuration management related decisions. Further, the service data generated by the trained model contains the processed data in the required format along with the required metadata such as the record of changes made, the need of a particular change and the like.

At step [408], the method comprises routing, by at least one processor via the communication interface, the service data for the automated configuration management. In a non-limiting embodiment, the automated configuration management is done through a configuration management system that relies directly upon the service data as provided in the present disclosure to make informed decisions for the system requirements. The present disclosure facilitates to create a robust and bug-free system that responds to the contingent requirements with minimal manual intervention. After performing the automated configuration management using the service data, the method terminates at step [410].

Figure 5:
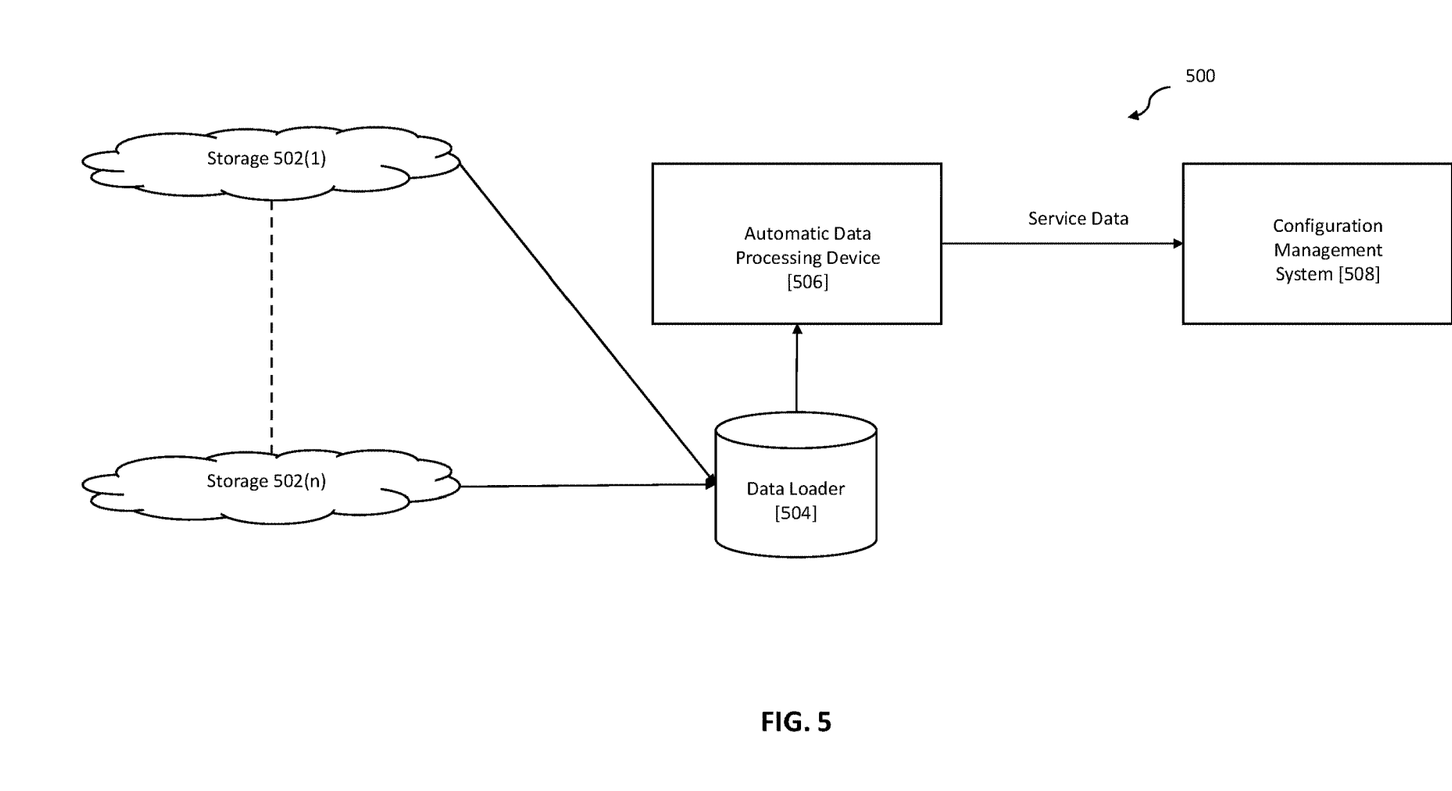
FIG. 5 illustrates a process flow diagram for implementing a method for automated data driven configuration management, in accordance with an exemplary embodiment of the present disclosure.

FIG. 5 illustrates a process flow usable for implementing a method for automated data driven configuration management, according to an exemplary embodiment. As illustrated in FIG. 5, the process flow 500 begins with reading and receiving data from a plurality of storages 502(1) to 502(n) also referred to herein as a plurality of sources. The plurality of sources includes but is not limited to a physical server, cloud-based servers, data lakes, and/or a data source. The plurality of sources is used to fetch or extract the raw data for the processing. The data is retrieved and stored in data loader (504) which is a cached database and stores the raw data for the quick access of the required data. The raw data that is stored in the data loader is then subjected to processing by Automatic Data Processing Device (506) (202) that automates the process of generating service data. The service data is ready to be used by the configuration management system (508) for decision making related to the system requirements. The service data includes the processed data generated by the trained model and comprises the metadata in the form of data lineage. The data lineage uncovers the entire life cycle of the data from the start to the finish of the processing stage of the raw data. Data lineage can be simply understood as the process of understanding, recording, and visualizing data as it flows from the source till its final consumption, and recording all the transformations that the data is subjected to, and the reasons foror the transformations. The service data is then utilized by the automatic Configuration Management System (CMS) (508) in making crucial decisions based on the requirements of the system and associated users. The configuration management process is used to simplify the task of managing large and complex deployments and keeping the system updated. The main task of a CMS is to automatically install, upgrade and maintain software and/or configurations on the machines within the system.

The non-limiting models used by the CMS for managing a configuration of a system include a standalone model and a master-agent model. In the standalone model, there is no master server and the client devices are connected to workstations within the system. The change(s) in the system related to configuration can be pushed from the workstations to the client device. In a non-limiting embodiment, a client device can be a machine that includes any type of computing device.

On the other hand, in a master-agent model there is a master server that performs the task of providing all the necessary configuration information to the client devices within the system. The client devices periodically report their status to the master server. To prevent unauthorized changes being made to the master server, only administrator can make changes to the master server. The master-agent model can be implemented either by a push or pull model. In a pull model, the client devices ask for updated configurations periodically from the master server. In a push configuration, the master provides the updated configuration information to the client device at any time, based on the need. In addition to the above, the present disclosure also supports a combination of push and pull model. In the model, the client device periodically requests for updates and the master server can push configuration information updates at any time.

In a non-limiting embodiment, the present disclosure utilizes at least one authentication and authorization model including but not limited to Active Directory Federation Service (ADFS) for authentication, X.509 certificate-based authentication, Transport Layer Security (TLS) based authentication and authorization between components, OAuth for Application Programming Interface (API) based authorization and the like. The present disclosure is implemented on a Zero Trust Model with complete password less authentication and authorization. The Zero Trust Model relied upon by the present disclosure requires continuous authentication and authorization of all users, whether inside or outside the organization's network, before granting access to organization's data or the Configuration Management System.

In an example, if the data handled by the organization is changed due to change(s) in the configuration data from each application and network topology, then the baseline configuration of the Configuration Management System also needs to be updated. The update in the configuration management system may include an upgrade in the software or an installation of entirely new software as per the requirement. The manual intervention in providing data to the configuration management system for making decisions with respect to the additional software requirement(s) is a tedious and time-consuming process. In a non-limiting example of the present disclosure, the data is received automatically from the data lakes as per the requirement(s) and temporarily stored in the raw form in the data loader. The set of data received may be related to, but not limited to, physical and virtual networks, security posture, performance, configuration, security controls, audit and review of the system. The data from the data loader is then processed automatically using a trained model that generates data required by the configuration management system for the decision making. The service data generated by the trained model is utilized by the configuration management system for the decision making on the additional software requirements and accordingly the baseline configuration is updated to ensure robust bug-free performance.

Accordingly, with the technology of the present disclosure, an optimized process for automated data driven configuration management is disclosed. As is evident from the above disclosure, the present solution provides a significant technical advancement over the existing solutions by automatically providing service data to the configuration management system by using trained models. Further, the automated configuration management with minimal manual intervention saves a significant amount of time of support team of any organization. Therefore, as disclosed, the present invention is helpful and increases the efficiency of the system and reduces the time taken in updating the configuration management as per the dynamic requirements of the organization.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to an aspect of the present disclosure, a non-transitory computer readable storage medium storing instructions for automated configuration management is disclosed. The instructions comprise executable code which, when executed by a processor, causes the processor to receive a set of data from a plurality of sources. The set of data comprises raw data required for the automated configuration management. The plurality of sources comprises at least one from among a local server and a cloud server configured to store the set of data.

Next, the processor is configured to automatically process the received data into service data using at least one trained model. The at least one trained model comprises a machine learning model. The service data comprises output data required for the automated configuration management. The output data further comprises a record of at least one change performed on the set of data during the automatic processing of the received data. Next, the processor is configured to route the service data for the automated configuration management.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automated configuration management, the method being implemented by at least one processor, the method comprising:

receiving, by the at least one processor via a communication interface, a set of data from a plurality of sources;

automatically processing, by the at least one processor, the received data into service data using at least one trained model; and routing, by the at least one processor via the communication interface, the service data for the automated configuration management, wherein the automated configuration management is performed by relying directly on the service data to make informed decisions for system requirements, and wherein the automated configuration management is used to simplify a task of managing large and complex deployments and keeping system updated by automatically installing, upgrading, and maintaining software configurations.

2. The method as claimed in claim 1, wherein the set of data corresponds to raw data required for the automated configuration management.

3. The method as claimed in claim 1, wherein the plurality of sources comprises at least one from among a local server and a cloud server configured to store the set of data.

4. The method as claimed in claim 1, wherein the at least one trained model comprises a machine learning model.

5. The method as claimed in claim 1, wherein the service data comprises output data required for the automated configuration management, wherein the output data further comprises a record of at least one change performed on the set of data during the automatic processing of the received data.

6. A computing device configured to implement an execution of a method for automated configuration management, the computing device comprising:

a processor;

a memory; and a communication interface coupled to each of the processor and the memory, wherein the processor is configured to:

receive, via the communication interface, a set of data from a plurality of sources;

automatically process the received data into service data using at least one trained model; and route, via the communication interface, the service data for the automated configuration management, wherein the automated configuration management is performed by relying directly on the service data to make informed decisions for system requirements, and wherein the automated configuration management is used to simplify a task of managing large and complex deployments and keeping system updated by automatically installing, upgrading, and maintaining software configurations.

7. The computing device as claimed in claim 6, wherein the set of data corresponds to raw data required for the automated configuration management.

8. The computing device as claimed in claim 6, wherein the plurality of sources comprises at least one from among a local server and a cloud server configured to store the set of data.

9. The computing device as claimed in claim 6, wherein the at least one trained model comprises a machine learning model.

10. The computing device as claimed in claim 6, wherein the service data comprises output data required for the automated configuration management, wherein the output data further comprises a record of at least one change performed on the set of data during the automatic processing of the received data.

11. A non-transitory computer readable storage medium storing instructions for automated configuration management, the instructions comprising executable code which, when executed by a processor, causes the processor to:

receive a set of data from a plurality of sources;

automatically process the received data into service data using at least one trained model; and route the service data for the automated configuration management, wherein the automated configuration management is performed by relying directly on the service data to make informed decisions for system requirements, and wherein the automated configuration management is used to simplify a task of managing large and complex deployments and keeping system updated by automatically installing, upgrading, and maintaining software configurations.

12. The storage medium as claimed in claim 11, wherein the set of data comprises raw data required for the automated configuration management.

13. The storage medium as claimed in claim 11, wherein the plurality of sources comprises at least one from among a local server and a cloud server configured to store the set of data.

14. The storage medium as claimed in claim 11, wherein the at least one trained model comprises a machine learning model.

15. The storage medium as claimed in claim 11, wherein the service data comprises output data required for the automated configuration management, wherein the output data further comprises a record of at least one change performed on the set of data during the automatic processing of the received data.

* * * * *